PUSH-PULL LIMITER WITH INDUCTIVE AVERAGING ELEMENT
Filed Aug. 13, 1959
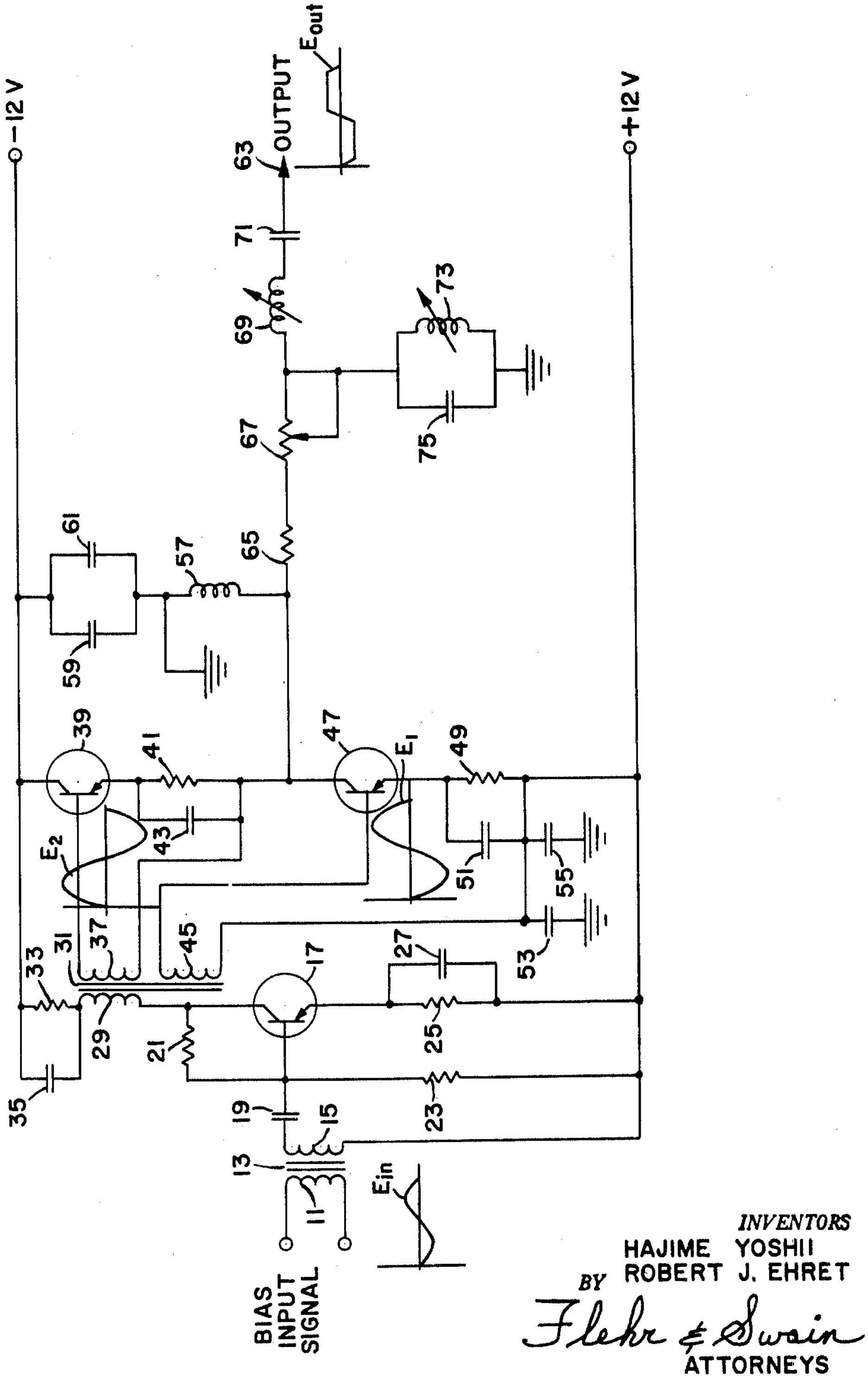
INVENTORS
HAJIME YOSHII
ROBERT J. EHRET
BY Flehr & Swain
ATTORNEYS 3,115,582
Patented Dec. 24, 1963

3,115,582

PUSH-PULL LIMITER WITH INDUCTIVE AVERAGING ELEMENT

Hajime Yoshii, Morgan Hill, and Robert J. Ehret, Los Altos, Calif., assignors to Ampex Corporation, Redwood City, Calif., a corporation of California Filed Aug. 13, 1959, Ser. No. 833,632
4 Claims. (Cl. 307—88.5)

This invention relates to high frequency bias circuits and more particularly to high frequency bias circuits having a minimum even harmonic distortion.

The use of high frequency bias in the magnetic recording art is well known. It has been determined through experiment and otherwise that when even harmonics are present in the high frequency bias they create distortion and noise in the recording. The presence of odd harmonics apparently does not cause distortion or noise in the recording process. Consequently in order to provide freedom from distortion and a noise free magnetic recording process, it is desirable to remove the even order harmonics.

It is therefore an object of this invention to provide a high frequency bias circuit in which even harmonic distortion and noise is minimized with variation in the asymmetry of the bias input signal.

It is another object of the invention to provide a high frequency bias circuit which produces a minimum of noise and distortion in the recording process.

It is still another object of this invention to provide a high frequency bias system in which the bias amplitude is maintained constant even with variations of temperature, input-signal voltage, gain of the active elements used, or other circuit effects.

The above mentioned objects are attained in this invention by the use of limiting action and of averaging element. A high frequency sinusoidal or square-wave signal is applied to the input of a push-pull limiter. The output of the limiter is applied to an averaging circuit such as an inductor. The output of the averaging circuit will be a high frequency voltage which has an average value of approximately zero and relatively low even order harmonics.

The aforementioned objects and others will become more apparent upon a reading of the following description in conjunction with the single FIGURE which is a schematic diagram of one embodiment of the invention.

*Description of the Circuit*

Referring to the figure, a sinusoidal or square-wave bias input signal is applied to the primary 11 of the transformer 13. The secondary 15 of the transformer 13 has one of its ends applied to a positive terminal of a power supply. The other end of the secondary 15 is coupled to the base of transistor 17 through the capacitor 19. The base and collector of transistor 17 are coupled together through the resistor 21. The base is also connected to the positive terminal through the resistor 23. The emitter of the transistor 17 is connected to the positive terminal through the resistor 25 and the capacitor 27 connected in parallel with the resistor 25. The collector of the transistor 17 is connected to a negative terminal of the power supply through the primary 29 of transformer 31 and the parallel circuit including the resistor 33 and the capacitor 35. One end of the secondary 37 of the transformer 31 is connected to the base of the transistor 39, while the other end is connected to the emitter of the transistor 39 through the parallel circuit including the resistor 41 and capacitor 43. The secondary 45 has one of its ends connected to the base of the transistor 47, while the other end of the secondary 45 is connected to the emitter of the transistor 47 through the parallel circuit including the resistor 49 and capacitor 51. The lower end of the secondary 45 is tied to ground through the capacitors 53 and 55. The lower end of the secondary 45 is also tied directly to the positive terminal, while the lower end of the secondary 37 is tied directly to the collector of the transistor 47. Between the collector of the transistor 47 and the negative terminal is the circuit including the inductor 57 and the parallel capacitors 59 and 61. The junction of the parallel capacitors 59 and 61 and the inductor 57 is tied to ground. The collector of the transistor 47 is connected to the high frequency bias output terminal 63 through the resistor 65, potentiometer resistance 67, the inductor 69 and capacitor 71. The wiper of the potentiometer 67 is connected to the junction of the resistance 67 and inductance 69. This junction is in turn returned to ground through the parallel circuit including inductance 73 and capacitance 75.

*Operation of the Circuit*

In operation, a high frequency sinusoidal input signal $E_{in}$ is transformer coupled to the base of the transistor 17 through the transformer 13. The transistor 17 amplifies the signal and applies the amplified sinusoidal voltage $E_1$ and $E_2$ to the bases of the transistors 39 and 47 180° out of phase. Transistors 39 and 47 are operated as a well known push-pull amplifier which is modified to the extent that a parallel resistor-capacitor network is included in the emitter circuit of each of the transistors. These transistors are driven between cutoff and saturation, thereby providing a limiting action, where the peak output voltages at the junction of inductor 57 and the collector of transistor 47 are determined by the positive and negative supply voltages. The secondaries 37 and 45 of transformer 31 are twisted pair wires wound bifilar to aid symmetry in the limiting action. Capacitors 53 and 55 assure a low impedance path between positive terminal and ground, and capacitors 59 and 61 assure a low impedance path between negative terminal and ground during the transient portion of the limiting action. Thus the limiting action is independent of the internal impedances of the power supplies supplying power to the positive and negative terminals.

The inductance 57 tends to average the positive and negative excursions of the transistor outputs. More particularly, if one of the transistors conducts for more than one-half cycle of the applied input voltage, current flowing in the emitter circuit of the transistor conducting for the prolonged interval develops a voltage across the biasing network situated therein and results in the conducting transistor being biased toward cut-off. This is accomplished since the inductor in the output circuit provides a low impedance path to ground for the excess current flow. This, in conjunction with the peak limiting action of the transistors 39 and 47, creates an output voltage having positive and negative excursions which are equal in amplitude and duration. Moreover, the well established function of the push-pull amplifier of eliminating even order harmonics in the output thereof further aids in the production of a substantially rectangular wave biasing voltage which may be satisfactorily utilized in any number of recording processes. Consequently the output contains a minimum of D.C. and even order harmonics.

The presence of a D.-C. component in the A.-C signal can be accomplished only by transistor 47 or 39 conducting for a longer period. Under such circumstances the transistor bias will rise dependent upon the respective emitter bias circuit including either resistor 41 and capacitor 43 or resistor 49 and capacitor 51. The emitter bias will cause cutoff in that transistor which is conducting for the longer period.

The effect of temperature on the circuit variations is evidenced by variation of conduction time in the transistors. Since the variation in the transistors is not necessarily proportional, one may conduct for a longer period than the other. The longer conduction period of a transistor will give rise to a D.-C. component in the output. The D.-C. bypass corrects any such variations. The correction is made more positive by providing the current responsive bias circuit for each transistor.

The effects of varying bias input signal voltage is overcome by the limiting action of transistors 39 and 47 whereby the positive and negative excursions of the voltage at the junction of collector of transistor 47 and inductor 57 are controlled by the positive and negative supply voltages. As the bias input signal voltage is increased beyond the minimum necessary for the limiting action, the base to emitter junctions of transistors 39 and 47 limit the voltages appearing at secondaries 37 and 45 of transformer 31. Thus the output voltage remains constant with varying bias signal input signal between the minimum voltage necessary for limiting action and the maximum voltage necessary for the breakdown of base to emitter junction. This mode of operation minimizes the effects of variation in the gains of transistors.

The output $E_{out}$ is substantially a rectangular wave and is connected to the output terminal through two tuning circuits including the inductors 69 and 73 and the capacitors 75 and 71, respectively, and the level control including resistors 65 and 67. This pair of tuning circuits constitutes a well known band-pass filter network.

*Particular Embodiment*

A circuit conforming to the schematic of the diagram was built and tested in which the following components were used:

| | |
|---|---|
| Transistors: | |
| **17** | 2N 1065. |
| **39** | 2N 1065. |
| **47** | 2N 1065. |
| Resistors: | |
| **21** | 3300 ohms. |
| **23** | 1000 ohms. |
| **25** | 390 ohms. |
| **33** | 1500 ohms. |
| **41** | 22 ohms. |
| **49** | 22 ohms. |
| **65** | 100 ohms. |
| **67** | 500 ohms potentiometer. |
| Capacitors: | |
| **19** | 0.1 microfarad. |
| **27** | 0.1 microfarad. |
| **35** | 0.1 microfarad. |
| **43** | 0.1 microfarad. |
| **51** | 0.1 microfarad. |
| **53** | 0.1 microfarad. |
| **55** | 10 microfarads. |
| **59** | 0.1 microfarad. |

| | |
|---|---|
| **61** | 10 microfarads. |
| **71** | 47 mmf. |
| **75** | .002 microfarad. |
| Transformers: | |
| **13** | 5:1 pulse transformer. |
| **31** | 5:1 pulse transformer, single wire primary and twisted-pair bifilar-wound secondary. |
| Inductors: | |
| **57** | 220 mh. |
| **69** | 540 mh.±80 mh. |
| **73** | 12.6 mh.±2 mh. |

Under experimental tests with an input square-wave signal having an asymmetry of ±15%, the high frequency output signal had asymmetry of only ±3%.

We claim:

1. A high frequency biasing circuit which comprises first and second amplifying means connected in circuit as a push-pull amplifier network having an output circuit between the first and second amplifying means and a reference potential; means for supplying independent alternating voltages differing in phase by 180° to each of said first and second amplifying means, said amplifying means being alternately driven by said voltages between cut-off and saturation so that limiting action is effected thereby; biasing networks including a separate power supply and a resistive-capactive network coupled to each of said first and second amplifying means; and two-terminal inductive means connected directly to a reference potential in the output circuit of said push-pull amplifier network and cooperable with said biasing networks for controlling the conduction period of said amplifier.

2. A high frequency circuit for producing biasing voltage which comprises a pair of like transistors arranged in circuit as a push-pull amplifier network having an output circuit between the transistors and ground; resistor-capacitor biasing networks, one each of said biasing networks being connected in circuit with each of said transistors; means for applying a high frequency driving voltage to each of said transistors, said driving voltages being 180° out of phase and being of sufficient magnitude to alternatively drive said transistors between cut-off and saturation; and inductive means connected directly to ground in the output circuit of said push-pull amplifier network and cooperable with said resistor-capacitor biasing networks for developing a biasing voltage across the latter to control the conduction periods of said transistors.

3. A high frequency biasing circuit which comprises an input circuit; a first transistor amplifier connected within said input circuit; second and third transistor amplifiers connected in circuit as a push-pull amplifier network; means for coupling the amplified input signal from said first transistor amplifier to said push-pull amplifier network, said coupling means providing independent high frequency driving voltages to the base-emitter circuits of each of said second and third transistor amplifiers differing in phase by 180° and sufficient in magnitude to drive said transistor amplifiers between saturation and cut-off; an output circuit; said output circuit having a band-pass filter network connected therein and having a substantially rectangular wave high frequency biasing voltage developed thereacross by the alternate conduction of said second and third transistor amplifiers; a pair of biasing networks being connected in the emitter circuit of each of said second and third transistor amplifiers; and inductive means connected directly to ground potential in said output circuit in series with said biasing networks and cooperable therewith for controlling the conduction periods of said second and third transistor amplifiers.

4. A high frequency bias circuit comprising at least a pair of limiting amplifiers connected in a push-pull amplifier circuit; a current responsive biasing network including a separate power supply and a separate resistive-capacitive network coupled to each amplifier; means for applying an input sigal simultaneously to said amplifiers; an output circuit coupled between said limiting amplifiers and ground; and a two-terminal inductive element, one terminal being connected directly to ground potential and the other terminal being coupled to said amplifiers and said output circuit, whereby said inductive element and said current responsive biasing networks eliminate undesirable harmonic components from the output signal received from the limiting amplifiers.

References Cited in the file of this patent

UNITED STATES PATENTS

| | | |
|---|---|---|
| 2,890,352 | Goodrich | June 9, 1959 |
| 2,918,573 | Hollmann | Dec. 22, 1959 |
| 3,015,075 | Bargellini | Dec. 26, 1961 |
| 3,015,780 | Schayes et al. | Jan. 2, 1962 |

FOREIGN PATENTS

| | | |
|---|---|---|
| 811,766 | Great Britain | Apr. 8, 1959 |